United States Patent
Sipe et al.

(10) Patent No.: US 9,473,668 B2
(45) Date of Patent: Oct. 18, 2016

(54) DISTRIBUTED STORAGE AND PROCESSING OF MAIL IMAGE DATA

(75) Inventors: Stanley Wayne Sipe, Mansfield, TX (US); Michael David Carpenter, Arlington, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 404 days.

(21) Appl. No.: 13/442,053

(22) Filed: Apr. 9, 2012

(65) Prior Publication Data
US 2013/0110972 A1    May 2, 2013

Related U.S. Application Data

(60) Provisional application No. 61/554,172, filed on Nov. 1, 2011.

(51) Int. Cl.
| | | |
|---|---|---|
| *G06F 15/16* | (2006.01) | |
| *H04N 1/32* | (2006.01) | |
| *B07C 3/12* | (2006.01) | |
| *H04L 29/08* | (2006.01) | |

(52) U.S. Cl.
CPC ............. *H04N 1/32122* (2013.01); *B07C 3/12* (2013.01); *H04L 67/2804* (2013.01); *H04N 2201/3205* (2013.01); *H04N 2201/325* (2013.01); *H04N 2201/3207* (2013.01); *H04N 2201/3226* (2013.01); *H04N 2201/3278* (2013.01)

(58) Field of Classification Search
CPC ............................ H04L 67/2804; H04L 12/00
USPC ........................................................ 709/217
See application file for complete search history.

(56) References Cited

U.S. PATENT DOCUMENTS

| | | | |
|---|---|---|---|
| 6,772,130 B1* | 8/2004 | Karbowski et al. | 705/26.1 |
| 7,003,376 B2* | 2/2006 | Witmond et al. | 700/225 |
| 7,576,752 B1* | 8/2009 | Benson | G06F 3/1415 345/619 |
| 8,682,934 B2* | 3/2014 | Hokimoto | 707/802 |
| 2002/0029166 A1* | 3/2002 | Jacobs et al. | 705/14 |
| 2002/0036804 A1* | 3/2002 | Taniguchi et al. | 358/443 |
| 2002/0135801 A1* | 9/2002 | Tessman | G06F 17/30265 358/1.15 |
| 2003/0041114 A1* | 2/2003 | Murakami et al. | 709/206 |
| 2003/0111524 A1* | 6/2003 | Wells et al. | 235/375 |
| 2004/0122918 A1* | 6/2004 | Fredlund et al. | 709/219 |
| 2004/0139033 A1* | 7/2004 | Amato | 705/400 |
| 2004/0230543 A1* | 11/2004 | Baker et al. | 705/401 |
| 2005/0080871 A1* | 4/2005 | Dinh et al. | 709/217 |
| 2005/0134707 A1* | 6/2005 | Perotti | H04N 1/00342 348/239 |
| 2005/0198118 A1* | 9/2005 | Viger | G06F 17/30905 709/203 |
| 2005/0251500 A1* | 11/2005 | Vahalia et al. | 707/1 |
| 2006/0203104 A1* | 9/2006 | Vau et al. | 348/231.3 |
| 2007/0033531 A1* | 2/2007 | Marsh | 715/738 |
| 2007/0078898 A1* | 4/2007 | Hayashi et al. | 707/104.1 |
| 2007/0226313 A1* | 9/2007 | Li et al. | 709/217 |
| 2008/0170271 A1* | 7/2008 | Lee | 358/402 |
| 2008/0320092 A1* | 12/2008 | Campbell et al. | 709/206 |
| 2009/0037899 A1* | 2/2009 | Dharap | G06F 8/65 717/173 |
| 2009/0153893 A1* | 6/2009 | Kitora | 358/1.13 |

(Continued)

*Primary Examiner* — Razu A Miah

(57) ABSTRACT

System, methods, and computer-readable media. A method includes maintaining an original image of a mail piece in a local image server and generating metadata corresponding to the original image by the local image server. The method includes transmitting the metadata to a regional image server over a network. The method includes receiving a request for the original image from a second system, and transmitting the original image to the second system in response to the request.

20 Claims, 3 Drawing Sheets

(56) References Cited

U.S. PATENT DOCUMENTS

| | | | |
|---|---|---|---|
| 2009/0185219 A1* | 7/2009 | Yagi | G06Q 10/06 358/1.15 |
| 2009/0195807 A1* | 8/2009 | Soneoka et al. | 358/1.13 |
| 2010/0007928 A1* | 1/2010 | Kashioka | H04N 1/00225 358/474 |
| 2010/0138417 A1* | 6/2010 | Ma et al. | 707/736 |
| 2010/0299707 A1* | 11/2010 | Kim | H04N 7/17318 725/51 |
| 2011/0138281 A1* | 6/2011 | Lai | H04L 67/2804 715/716 |
| 2011/0196888 A1* | 8/2011 | Hanson | G06F 17/30265 707/769 |
| 2011/0320554 A1* | 12/2011 | Melander | H04L 67/104 709/206 |
| 2012/0096083 A1* | 4/2012 | Teng et al. | 709/203 |
| 2012/0197966 A1* | 8/2012 | Wolf et al. | 709/203 |
| 2013/0007097 A1* | 1/2013 | Sambe et al. | 709/203 |
| 2013/0036438 A1* | 2/2013 | Kutaragi et al. | 725/38 |
| 2013/0151937 A1* | 6/2013 | Weber et al. | 715/207 |

* cited by examiner

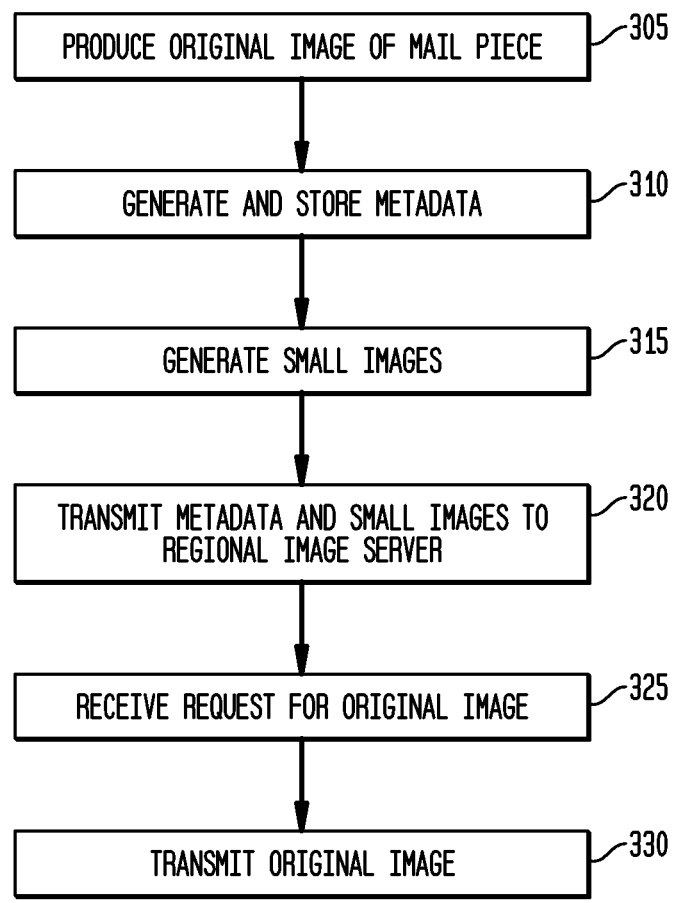

DISTRIBUTED STORAGE AND PROCESSING OF MAIL IMAGE DATA

CROSS-REFERENCE TO OTHER APPLICATIONS

This application claims the benefit of the filing date of U.S. Provisional Patent Application 61/554,172, filed Nov. 1, 2011, which is hereby incorporated by reference.

TECHNICAL FIELD

The present disclosure is directed, in general, to the processing of mail and mail images.

BACKGROUND OF THE DISCLOSURE

Improved postal processing and other systems are desirable.

SUMMARY OF THE DISCLOSURE

Various disclosed embodiments include a system and method. A method includes maintaining an original image of a mail piece in a local image server and generating metadata corresponding to the original image by the local image server. The method includes transmitting the metadata to a regional image server over a network. The method includes receiving a request for the original image from a second system, and transmitting the original image to the second system in response to the request.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 3 depicts a flowchart of a process in accordance with disclosed embodiments.

DETAILED DESCRIPTION

Figure 1:
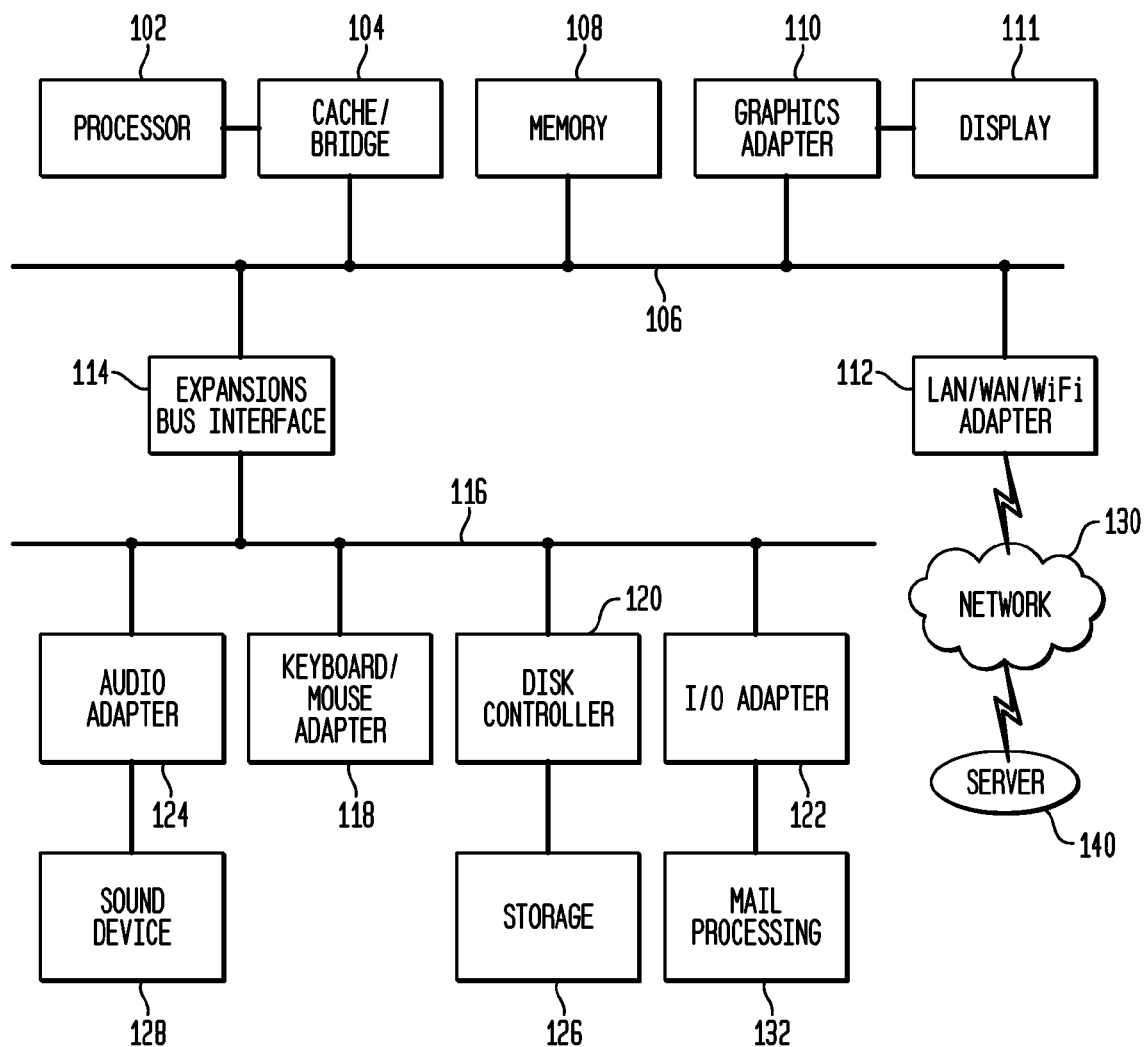
FIG. 1 depicts a block diagram of a data processing system in which an embodiment can be implemented.
Figure 2:
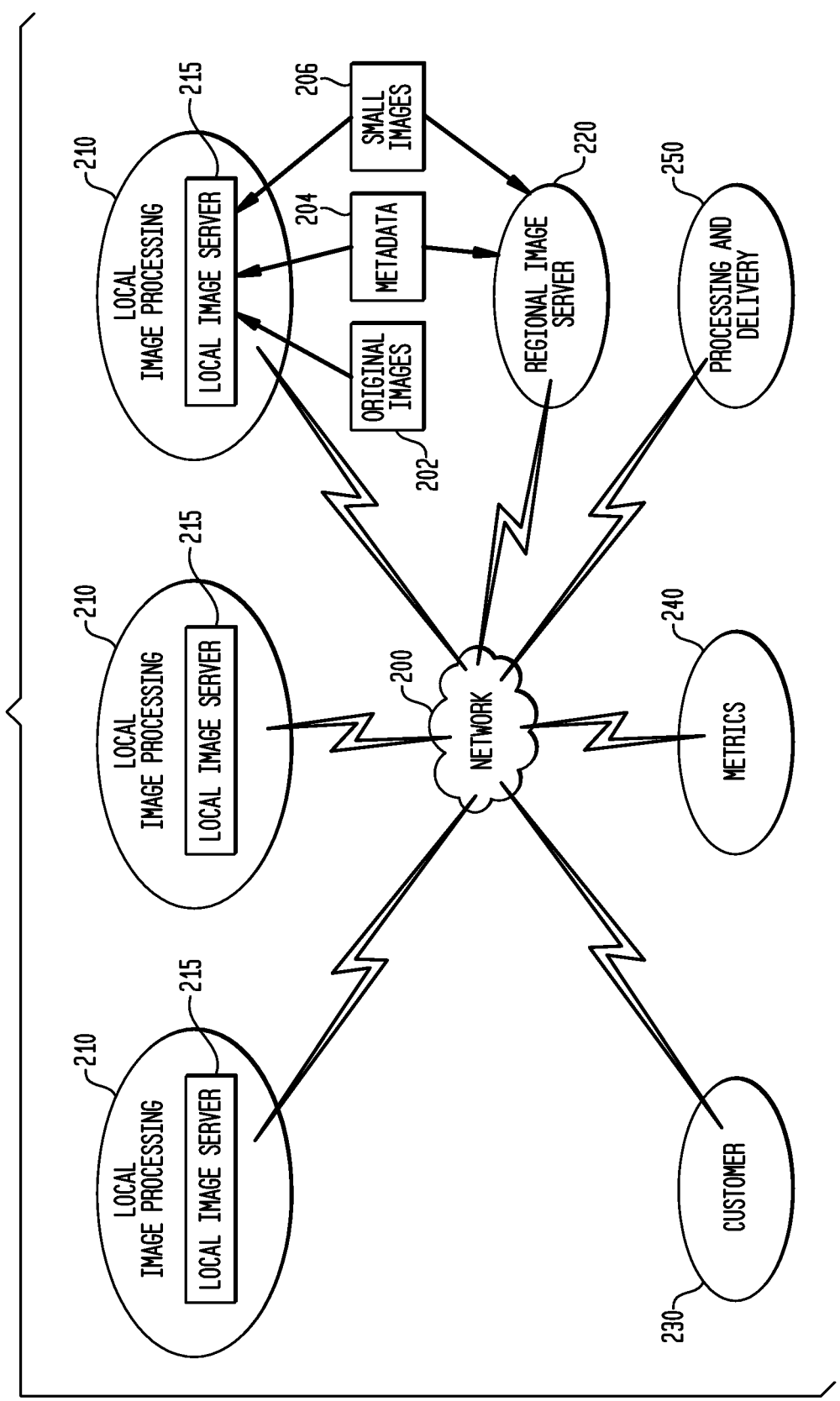
FIG. 2 is a high-level diagram of a distributed mail piece image processing system in accordance with disclosed embodiments.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

A "mail piece" or "mailpiece", as used herein, is intended to refer to any item being shipped or processed as described herein, whether it is a letter, flat, package, or other parcel or item. "Postal" processing and "mail" processing is intended to refer to processing and handling as described herein, whether performed by a governmental postal service, a private courier or delivery service, a pre-processor, or other entity that receives, processes, transports, or delivers mailpieces.

Modern postal processing involves automatic recognition processes based on electronic images of individual mail pieces prior to their delivery. In current systems, the images are retained as long as they are needed to determine what processing is necessary and to determine the delivery location.

Retention and indexing of the images to make them available for other purposes offers the postal agency opportunities for information-based products and services, as well as purposes related to security and revenue protection. To enable these uses, the images should be searchable and available across networks within a short time after they are created.

The electronic images in their original form, and as used in automatic recognition, are relatively large. Attempting to aggregate the images into a single storage point in the network can consume massive bandwidth due to the large number of images, the rate at which they are generated, and their large size. One approach to addressing this problem involves buffering the images locally and transmitting them in aggregation gradually, at a rate lower than they are generated. This is possible when the period during which images are generated is shorter than the maximum period during which the images would be aggregated and in cases in which the aggregated images would not need to be accessed immediately.

Disclosed processes for making mailpiece images available can make the images available for alternative uses within a short period after their creation without imposing radically-increased network bandwidth requirements.

Various embodiments include methods and apparatuses that facilitate the efficient aggregation of electronic images of mail across an entire extended geographic region or nation, such that large, high-resolution images do not need to be moved over network trunks to a centralized network node unless they are specifically needed.

FIG. 1 depicts a block diagram of a data processing system 100 in which an embodiment can be implemented, for example, as a mail processing system including image processing, configured to perform processes as described herein, and in particular as a local or regional image server for mail piece images. The data processing system 100 includes a processor 102 connected to a level two cache/bridge 104, which is connected in turn to a local system bus 106. The local system bus 106 may be, for example, a peripheral component interconnect (PCI) architecture bus. Also connected to the local system bus 106 in the depicted example are a main memory 108 and a graphics adapter 110. The graphics adapter 110 may be connected to a display 111.

Other peripherals, such as a local area network (LAN)/Wide Area Network/Wireless (e.g. WiFi) adapter 112, may also be connected to the local system bus 106. An expansion bus interface 114 connects the local system bus 106 to an input/output (I/O) bus 116. The I/O bus 116 is connected to a keyboard/mouse adapter 118, a disk controller 120, and an I/O adapter 122. The disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices. The I/O adapter 122 can be connected to any number of input/output devices, including in particular mail processing equipment 132 that is capable of performing other mail processing functions, including transporting, sorting, scanning, imaging, and other processes that may be useful for processing parcels, letters, packages, flats, and other mail pieces, whether processed by postal services or private courier or delivery services.

Also connected to the I/O bus 116 in the example shown is an audio adapter 124, to which sound devices 128 are connected, including in particular an audio input such as a microphone for voice recognition processes and an audio output such as a speaker or headset connection for audio feedback to an operator. The keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. In some embodiments, multiple data processing systems may be connected and configured to cooperatively perform the processing described herein. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

The LAN/WAN/Wireless adapter 112 can be connected to a network 130 (not a part of data processing system 100), which can be any public or private data processing system network or combination of networks, as known to those of skill in the art, including the Internet. The data processing system 100 can communicate over the network 130 with a server system 140, which is also not part of the data processing system 100, but can be implemented, for example, as a separate data processing system 100.

As described above, disclosed embodiments include improved systems and methods techniques for mail piece image management, storage, and transfer.

FIG. 2 is a high-level diagram of a distributed mail piece image processing system in accordance with disclosed embodiments.

This figure shows a plurality of local image processing facilities 210. These local image processing facilities 210 are typically geographically-separated mail processing facilities, whether private processors or a part of the United States Postal Service (USPS) or other governmental postal service. Each of these local image processing facilities 210 may perform any number of conventional mail processing functions, but in particular can perform mail piece imaging functions to produce images that are managed as described herein. The local image processing facilities 210 each may include one or more local image servers 215 that can each be implemented as one or more data processing systems 100, configured to function as described herein.

Local image processing facilities 210 can communicate with a regional image server 220, which also can be implemented as one or more data processing systems 100. Local image processing facilities 210 can communicate with regional image server 220 using any combination of public or private communications systems or networks, including the Internet, illustrated as network 200. Regional image server 220 can be configured to manage image data for a specific geographic area having multiple local image processing facilities 210, and can cover a region that includes all or part of a country.

Regional image server 220 and the local image processing facilities 210 can also communicate with a variety of other systems using network 200. These systems can include, for example, customer systems 230 that can include mail customers and mail image customers as described below. These systems can include metric and analysis systems 240 that can include any systems that analyze and report on mail processing or mail image processing. These systems can include processing and delivery systems 250, which in particular can include USPS local delivery units, courier delivery and destination locations, and other systems used by postal systems and couriers to process and deliver mail based on mail images.

Postal agencies process mail in preparation for delivery in multiple processing facilities, which serve geographical regions of affiliated, smaller post offices. A network infrastructure such as network 200 is used connect processing facilities, post offices, and (to one extent or another) the customers that send and receive the mail. Various products and features require that the images, relevant portions of images, and/or data associated with those images be made accessible to provide services to customers.

To associate the mail pieces, images, snippets, metadata, and other data described herein, the systems can use a unique identifier for each mail piece to relate these various elements together. The identifier can be printed on the mail piece in human-readable or machine-readable form, or can be associated with each mail piece using a product such as the Siemens ARTid™ product. Other means and techniques for ensuring that the data, images, and mail pieces can be correctly associated with each other will be recognized by those of skill in the art, and are intended to fall within the scope of this disclosure.

According to various embodiments, images 202 are generated in a conventional fashion at local image processing facilities 210, typically at the same time as normal imaging and address recognition processes during mail processing, to produce images of the mail pieces and associated metadata.

The images are aggregated, including metadata 204 regarding each image 202, by local image servers 215 at local image processing facilities 210. In one embodiment, once the images 202 and metadata 204 are stored on local image servers 215, local image servers 215 generate related tow-resolution images and/or specific portions of the related images, and store these small images 206 as associated with the original mail images.

In various embodiments, metadata 204 corresponding to a mailpiece image 202, such as identification of sender and recipient, and the small images 206 such as other tow-resolution "thumbnail" images or relevant, cropped "snippet" sections of the image, are transmitted over the network 200 to allow customers 230 to view or otherwise make decisions based on them. In some embodiments, the small metadata 204 and small images 206 can also be stored in the regional image server 220, and can be transmitted on request to the other systems described herein.

In some embodiments, only metadata 204, typically that identifying the intended sender and recipient, would be transmitted over the network 200 to the regional image server 220, while the original images 202 are only retained on the local image servers 215. The data transmitted in these cases is much smaller than would be required to transmit the associated original images.

In various embodiments, at this point, the original images 202 are stored on local image servers 215 associated with local image processing facilities 210, which can be the local processing plant. Regional image server 220 stores aggregated metadata 204, potentially including small images 206, regarding all of the images of all of its affiliated local image servers 215. Significantly less data has been transmitted over regional and inter-regional network fabrics, but the total storage size of all of the data is slightly increased from the approach of aggregating all of the data to centralized storage rather than at the local image servers 215. The data stored on the regional server is connected to customer networks, potentially through secure connections to the internet, illustrated as network 200. Customers 230 may be presented or may otherwise have access to the data stored on the regional image server 220. This data can represent a smaller subset of data associated with the individual mail pieces than is stored on the local image servers 215, but may be accumulated over a longer period, and thus may ultimately become larger.

Present or potential customers 230, when presented with or otherwise having access to the subset of data on regional image server 220, may opt to be presented with or otherwise have access to more data or the entire data set of the mail pieces. The potential for having access to additional data may be limited according to time or other factors, such as the type of customer and/or negotiated service agreements. When the customer has accepted the option of being presented more data, regional image server 220 can receive the additional data from the corresponding local image server 215. Once the data is transferred, the potential customer may (or may not) be charged for the service of being presented the additional data. Other than reference data and specific logs, any data transferred to the regional image server 220 may be erased from the local image server 215.

Data including small images 206, metadata 204, and original images 202 can be transferred to regional image server 220 from the corresponding local image servers 215 on a scheduled basis, when requested by regional image server 220 when requested by customers 230, metrics system 240, or processing and delivery systems 250, or when "pushed" by the local image servers 215.

FIG. 3 depicts a flowchart of a process in accordance with disclosed embodiments that can be performed by a mail processing system such as a local image server 215. In particular, the process below can be performed by a plurality of local image servers all communicating with a common regional image server. Each local image server has at least a processor and an image storage device, and is configured to perform processes as described herein.

The local image server stores and maintains an original image of a mail piece (step 305). In some cases, the local image server can receive and image a mail piece to generate the original image directly; in other cases, the local image server receives the original image from the mail processing system that performed the imaging process. The local image server maintains original images for a plurality of mail pieces and the processes described herein can be used for a plurality of mail pieces.

The local image server can generate and store metadata corresponding to the original image (step 310). As part of this step, the local image server can perform an optical character recognition process or other detection processes on the original image to produce the metadata, which can include sender information, recipient information, postage information, size and weight information, or other information that describes the mail piece or the original image.

The local image server can generate and store small images corresponding to the original image (step 315). The small images can be low-resolution "thumbnail" images corresponding to the original image or relevant, cropped "snippet" sections of the original image.

The local image server can transmit the metadata or small images to the regional image server (step 320). This step can include first aggregating the metadata or small images for a plurality of original images, and transmitting the aggregate data to the regional server. The regional image server then can provide access to the metadata or small images to other systems, and respond to requests for this data, without the overhead of transferring the large original images to the regional image server. In particular, in this step, the local image server can transmit this data without transmitting the original images.

The local image server can receive a request for the original image from a second system (step 325). The request can be received from a regional image server, a customer system, a metrics system, a processing and delivery system, or other system.

The local image server can respond to the request by transmitting the original image to the second system (step 330). In some cases, if the second system is the regional image server, then the local image server then can delete its own copy of the original image, since it is now being maintained on the regional image server.

It is important to note that while the disclosure includes a description in the context of a fully functional system, those skilled in the art will appreciate that at least portions of the mechanism of the present disclosure are capable of being distributed in the form of a computer-executable instructions contained within a machine-usable, computer-usable, or computer-readable medium in any of a variety of forms to cause a system to perform processes as disclosed herein, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs). In particular, computer readable mediums can include transitory and non-transitory mediums, unless otherwise limited in the claims appended 115 hereto.

Although an exemplary embodiment of the present disclosure has been described in detail, those skilled in the art will understand that various changes, substitutions, variations, and improvements disclosed herein may be made without departing from the spirit and scope of the disclosure in its broadest form. In the processes described above, various steps may be performed sequentially, concurrently, in a different order, or omitted, unless specifically described otherwise.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method performed by a local image server, the method comprising:
   maintaining an original image of a mail piece in the local image server;
   generating metadata corresponding to the original image by the local image server, the metadata not including any image of the mail piece;
   transmitting the metadata to a regional image server over a network, without transmitting the original image to the regional image server with the metadata, wherein the regional image server manages image data for a specific geographic area of a country having multiple geographically-separated local image processing facilities;
   receiving a request for the original image from a second system; and
   transmitting the original image to the second system in response to the request.

2. The method of claim 1, wherein the local image server also generates one or more small images corresponding to the original image, the small images including at least one of a thumbnail image or a snippet section of the original image.

3. The method of claim 2, wherein the local image server also transmits the one or more small images to the regional image server.

4. The method of claim 1, wherein the metadata includes one or more of sender information, recipient information, postage information, size and weight information, or other information that describes the mail piece or the original image.

5. The method of claim 1, wherein the local image server aggregates metadata corresponding to a plurality of original images and transmits the aggregated metadata to the regional image server.

6. The method of claim 1, wherein the regional image server provides access to the metadata and responds to requests for this data.

7. The method of claim 1, wherein the second system is a customer system.

8. The method of claim 1, wherein the second system is the regional image server, and the local image server thereafter deletes the original image maintained by the local image server.

9. The method of claim 1, wherein the local image server receives and images the mail piece to produce the original image.

10. A local image server, comprising:
    at least one processor;
    an image storage device, the local image server configured to:
    maintain an original image of a mail piece in the local image server;
    generate metadata corresponding to the original image, the metadata not including any image of the mail piece;
    transmit the metadata to a regional image server over a network, without transmitting the original image to the regional image server with the metadata, wherein the regional image server manages image data for a specific geographic area of a country having multiple geographically-separated local image processing facilities;
    receive a request for the original image from a second system; and
    transmit the original image to the second system in response to the request.

11. The local image server of claim 10, wherein the local image server also generates one or more small images corresponding to the original image, the small images including at least one of a thumbnail image or a snippet section of the original image.

12. The local image server of claim 11, wherein the local image server also transmits the one or more small images to the regional image server.

13. The local image server of claim 10, wherein the metadata includes one or more of sender information, recipient information, postage information, size and weight information, or other information that describes the mail piece or the original image.

14. The local image server of claim 10, wherein the local image server aggregates metadata corresponding to a plurality of original images and transmits the aggregated metadata to the regional image server.

15. The local image server of claim 10, wherein the regional image server provides access to the metadata and responds to requests for this data.

16. The local image server of claim 10, wherein the second system is a customer system.

17. The local image server of claim 10, wherein the second system is the regional image server, and the local image server thereafter deletes the original image maintained by the local image server.

18. The local image server of claim 10, wherein the local image server receives the mail piece and images the mail piece to produce the original image.

19. A non-transitory computer readable medium having program instructions stored thereon executable by one or more processors to:
   maintain an original image of a mail piece in a local image server;
   generate metadata corresponding to the original image, the metadata not including any image of the mail piece;
   transmit the metadata to a regional image server over a network, without transmitting the original image to the regional image server with the metadata, wherein the regional image server manages image data for a specific geographic area of a country having multiple geographically-separated local image processing facilities;
   receive a request for the original image from a second system; and
   transmit the original image to the second system in response to the request.

20. The computer-readable medium of claim 19, wherein the instructions also cause the local image server to generate one or more small images corresponding to the original image, the small images including at least one of a thumbnail image or a snippet section of the original image, and transmit the one or more small images to the regional image server.

* * * * *